United States Patent
Jennings

(10) Patent No.: US 6,471,431 B1
(45) Date of Patent: Oct. 29, 2002

(54) SPREADER APPARATUS

(76) Inventor: Paul E. Jennings, 1210 23rd Ter. SE, Cape Coral, FL (US) 33990

( * ) Notice: Subject to any disclaimer, the term of this patent is extended or adjusted under 35 U.S.C. 154(b) by 0 days.

(21) Appl. No.: 09/892,448

(22) Filed: Jun. 28, 2001

(51) Int. Cl.[7] ............................................. A46B 11/00
(52) U.S. Cl. ........................ 401/48; 401/268; 222/623
(58) Field of Search .................... 401/48, 138, 268, 401/131; 222/623, 624, 625; 239/172; 47/1.7

(56) References Cited

U.S. PATENT DOCUMENTS

| | | | | |
|---|---|---|---|---|
| 3,173,165 A | * | 3/1965 | Speight | 15/533 |
| 3,208,094 A | * | 9/1965 | Pilkington | 401/138 |
| 3,457,015 A | * | 7/1969 | Taber et al. | 401/48 |
| 4,471,713 A | * | 9/1984 | Cote et al. | 401/48 |
| 4,699,537 A | * | 10/1987 | Cook, Jr. | 401/131 |

* cited by examiner

*Primary Examiner*—David J. Walczak

(57) ABSTRACT

A spreader apparatus that is used in dropping a powdery cleaning mixture on a contaminated concrete surface. The apparatus is of a material dropping hopper type that will drop a predetermined amount and layer on a surface. A horizontal brush is attached to the hopper between supporting legs to brush the dropped cleaning over the contaminated area of the concrete surface. A transparent cover covers the open end of the hopper.

3 Claims, 2 Drawing Sheets

SPREADER APPARATUS

BACKGROUND OF THE INVENTION

This invention relates to a substance spreader apparatus. The substance that needs to be spread is a powdery substance consisting of clay components. Such a substance is disclosed in my prior U.S. Pat. No. 5,723,424. It is a cleaning mixture that is being spread on concrete surfaces that have been contaminated with oil and other fluids that have been dropped from automobiles in gas stations, drive throughs, drive ways, parking areas and other areas wherever internal combustion engines in vehicles are operating. As disclosed in the above identified patent, this powdery clay composition has to be applied to the contaminated concrete surfaces and should be evenly spread thereon.

OBJECTED OF THE INVENTION

An object of the invention is to design an apparatus that will evenly drop a layer of a powdery cleaning substance onto a contaminated concrete surface and will at the same time brush the dropped powdery material over the concrete surface.

DETAILED DESCRIPTION OF THE INVENTION

Figure 1:
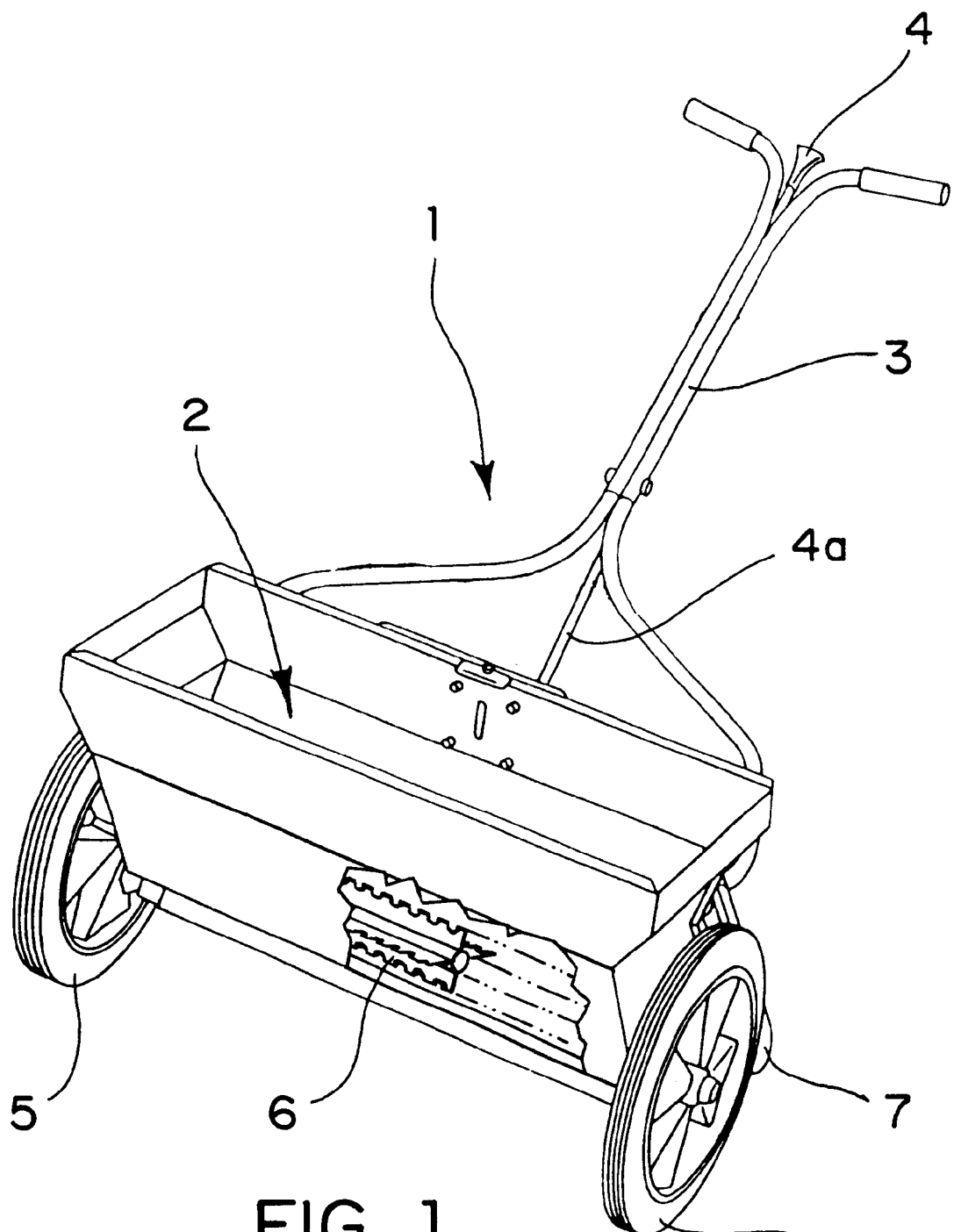
FIG. 1 is a spreader apparatus as it is known in the PRIOR ART.

FIG. 1 is a spreader apparatus 1 as it is known in the prior art. It is typically a drop spreader used mostly in the lawn care business for applying fertilizer or grass seeds.

The spreader 1 consists of a hopper 2 on which is mounted a handle 3. On handle 3, there is mounted an adjustment lever 4 which is used to adjust the amount of material that can flow from the bottom of the hopper. Then there are the two wheels 5 and one of the wheels is drivingly connected to a serrated rotor which aids in mixing the contents and/or wiping the material over openings in the bottom of the hopper so that even amounts of material are discharged across the bottom of the hopper. At 7, there is shown one of the two legs that will steady the spreader in an upright position when not in use.

Figure 2:
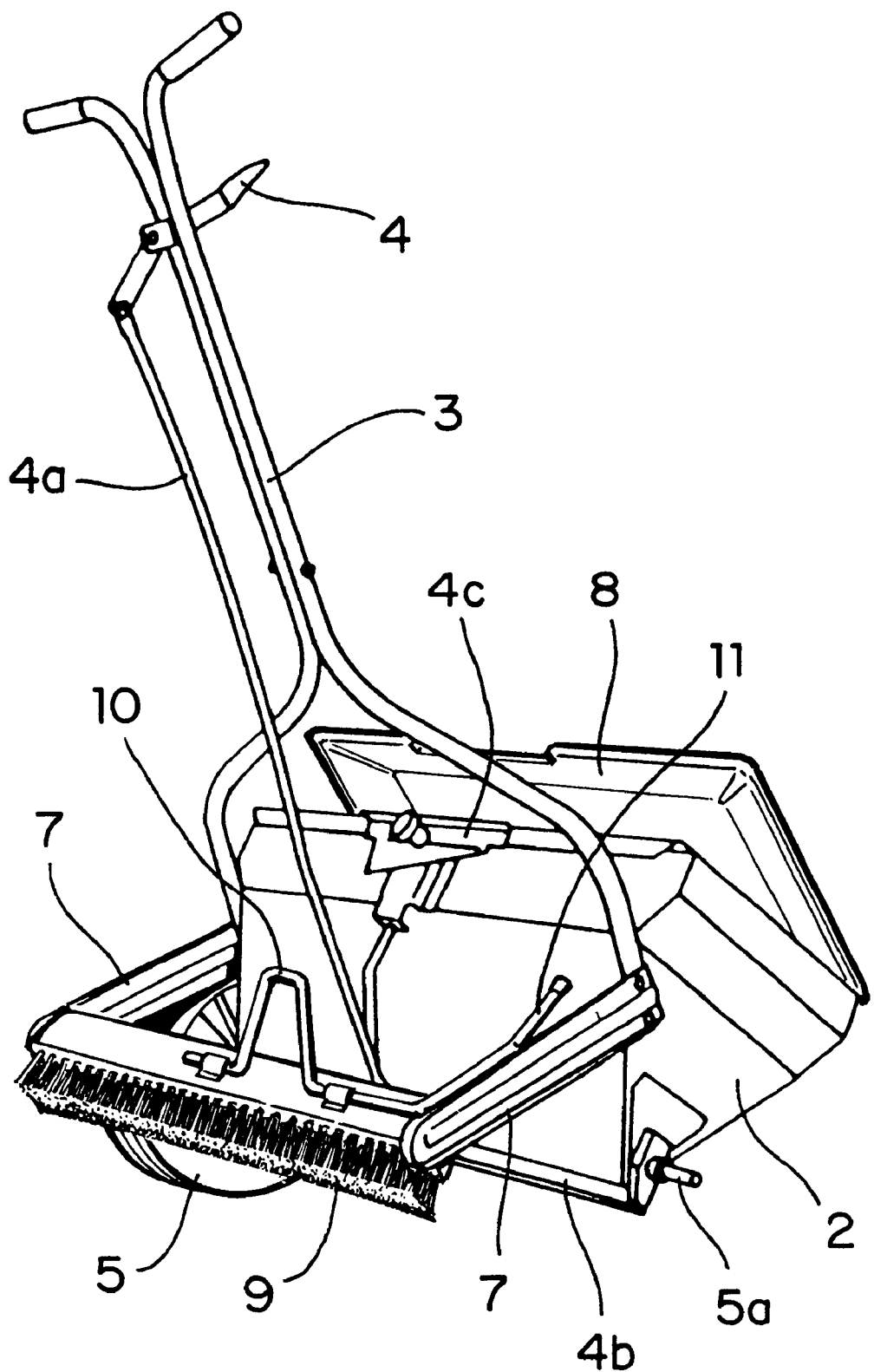
FIG. 2 is a modified spreader apparatus FIG. 1.

Turning now to FIG. 2 which represents the modifications that were made in order to be useful for this apparatus to operate in an environment it is designed for.

There are many elements that are the same as in FIG. 1 and, consequently, the same reference characters have been applied. In FIG. 2, 4a represents a connecting bar which is connected to a dispensing opening blade which extends all the way across the hopper openings which controls the amount of material to be dropped. As is well known in the art, 4c is a limiting metal plate having a slant thereon which controls the settings of the blade 4b. Also shown is the end of the shaft 5a of the rotor 6 which has a free wheeling wheel mounted thereon. Between the two legs 7, there is mounted a brush 9 which, as mentioned above, is instrumental in brushing the dropped cleaning material over the contaminated concrete surface. It is very important that this brush be disabled when the spreading apparatus is not in use. For this purpose, a kick stand 10 has been provided which is mounted on the brush 9 so that it may be moved up or down to place the brush 9 into operating or to disable the same when not in use. A handle 11 rotates the kick stand 10 into its proper position. Lastly, the hopper 2 has been provided with a transparent cover 8 for the dual purpose of providing a visual inspection of how much material is left in the hopper but most importantly to keep the very fine clay granular material from blowing away on a blustery wind day when the cleaning material is being applied.

It has been found that once the cleaning material has been dropped on the contaiminated concrete surface and has been brushed onto the surface, the blustery winds mentioned above do not further disturb the applied layer.

SUMMARY OF THE INVENTION

It can now be seen that the spreader apparatus as disclosed operates entirely different from what is known in the prior art in that the brushing addition to the spreader apparatus causes the apparatus to perform a completely different task than a fertilizer speader.

What I claim is:

1. A spreader apparatus consisting of a two wheeled hopper including a handle for moving the hopper, said handle having means for adjusting the amount of material to be dropped on any surface, one of said wheels driving a mixing rotor and two leg extensions for stabilizing said apparatus in an upright position when not in use, the improvement comprising:

a brush having bristles thereon mounted between said two legs and adapted to contact said ground when said spreader is in operation and a kick stand to disable the brush from contacting the surface to be cleaned when the apparatus is not in service.

2. The spreader apparatus of claim 1, including a handle for operating said kick stand.

3. The spreader apparatus of claim 1, including a transparent cover on said hopper.

* * * * *